(12) United States Patent
Wuersch et al.

(10) Patent No.: US 7,320,810 B2
(45) Date of Patent: Jan. 22, 2008

(54) FOOD PRODUCT WITH HIGH VISCOSITY

(75) Inventors: Piere Wuersch, La Tour de Peilz (CH); Olivier Ballevre, Lausanne (CH); Hubert Milon, Cugy (CH); Birgit Sievert, Epalinges (CH)

(73) Assignee: Nestec S.A., Vevey (CH)

( * ) Notice: Subject to any disclaimer, the term of this patent is extended or adjusted under 35 U.S.C. 154(b) by 231 days.

(21) Appl. No.: 10/500,187

(22) PCT Filed: Dec. 20, 2002

(86) PCT No.: PCT/EP02/14867

§ 371 (c)(1),
(2), (4) Date: Jun. 25, 2004

(87) PCT Pub. No.: WO03/055331

PCT Pub. Date: Jul. 10, 2003

(65) Prior Publication Data

US 2005/0031765 A1 Feb. 10, 2005

(30) Foreign Application Priority Data

Dec. 28, 2001 (EP) .................... 01131042

(51) Int. Cl.
*A23L 1/052* (2006.01)
*A23L 1/10* (2006.01)

(52) U.S. Cl. .............. 426/618; 426/436; 426/472; 426/478; 426/479; 426/573

(58) Field of Classification Search .......... 426/435, 426/472, 478, 479, 573, 618, 436
See application file for complete search history.

(56) References Cited

U.S. PATENT DOCUMENTS

| | | | |
|---|---|---|---|
| 4,876,102 A | 10/1989 | Feeney et al. | |
| 4,961,937 A | 10/1990 | Rudel | |
| 5,024,996 A * | 6/1991 | Ringe | 514/54 |
| 5,612,074 A | 3/1997 | Leach | |

FOREIGN PATENT DOCUMENTS

| | | |
|---|---|---|
| WO | WO 89/02225 | 3/1989 |
| WO | WO 01/26479 | 4/2001 |

OTHER PUBLICATIONS

Nnanna et al. article entitled: "Adsorption-isotherm and Effect of Gum Blends on Viscosity and Microstructure of Oat Gum (β-D-Glucan)" *Journal of Food Science*, vol. 61, No. 1, 1996, pp. 121-126.

* cited by examiner

*Primary Examiner*—Helen Pratt
(74) *Attorney, Agent, or Firm*—Bell, Boyd & Lloyd LLP

(57) ABSTRACT

The present invention relates to food products comprising in percent by weight of dry matter, 0.5-5% of a viscous soluble fibre, 2-20% oat bran concentrate, and 7-35% cereal bran. The specific amount of these constituents provide for a high viscosity and are suitable to delay glucose absorption or appearance in blood and/or to maintain raised glucose levels while avoiding high glucose peaks. The high viscosity of a food product was shown to be a key factor in the appearance of glucose in the blood stream. Hence, the food products according to the present invention are also suitable for diabetic patients.

26 Claims, 2 Drawing Sheets

FOOD PRODUCT WITH HIGH VISCOSITY

The present invention relates to a food product comprising a viscous soluble fiber, oat bran concentrate and oat bran. The present invention further relates to the use of viscous soluble fibre to synergistically increase viscosity of a food product, which also comprises oat bran and/or oat bran concentrate and to the use of cereal bran, to increase the viscosity of a food product, which also comprises a viscous soluble fiber and/or oat bran concentrate. The present invention relates further to the use of a viscous soluble fiber, oat bran and oat bran concentrate in the preparation of a food product for providing energy for prolonged time and/or for slowing down glucose appearance in blood and/or increasing viscosity of the food product.

BACKGROUND OF THE INVENTION

The beneficial properties of fiber as part of the daily diet have been more and more recognised during the last decades. They comprise soluble and non-soluble parts of food that are not digested by the enzymes of the gastrointestinal tract it has been shown that fiber plays a role in the prevention of certain large-intestine diseases, including cancer of the colon and diverticulitis. Certain fiber is reported to reduce cholesterol in serum and liver, regulate large bowel and to increase stool bulk.

From WO 9728700 (Société des Produits Nestlé) the skilled person can learn that soluble fiber may contribute to the maintenance of increased blood glucose levels, delay the onset of hypoglycemia and prevent acid reflux during exercise.

Specific soluble fiber has been suspected to slow down absorbtion of glucose in the gastro-intestinal tract and, more importantly, to prevent high glucose plasma peaks after consumption of a starchy material containing meal. This led to the further cognition that it may be the solubility of the fiber that actually influences the absorption rate of glucose.

As a consequence, EP 127287 (Nabisco Brands Inc.) teaches that a ready-to-eat food product preferably comprises 8-12% guar gum, a highly soluble fiber, besides other ingredients, in order to reduce insulin and permitting smooth blood sugar fluctuations. However true this may be, guar gum is a fiber which contributes to an unpleasant taste and it is not wished, also for "good-manufacturer's" reasons, to add this fiber in such high amounts.

In view of this and other prior art, it is wished to deliver the beneficial effect of highly viscous, soluble fiber by a food product, while the amount of the viscous soluble fiber in the food product is relatively small.

In other words, it is an objective to achieve a high viscosity in a food product by synergistically enhancing the viscosity effect of the soluble fiber present in the food product.

In particular, it is an objective of the present invention to achieve a high viscosity in a food product by using only small amounts of high-viscosity soluble fiber.

Since one of the beneficial effects of viscous soluble fiber is to slow down glucose absorption, it is wished to provide a food product, that is suitable to uphold beneficial blood glucose levels for prolonged time or to support and/or increase an athlete's performance or the endurance of an athlete.

It is a further object to provide a food product with a fiber composition or plant ingredients that procures a high viscosity to the food product.

In parallel, the food product must have a good texture, mouthfeel and overall organoleptic properties. In particular, the food product should not have bad taste owing to the presence of viscous soluble fiber.

It is further an objective of the present invention to provide a food product, wherein the carbohydrates, for example glucose, are only slowly released in the gastrointestinal tract. Such a food product would also be beneficial for diabetic patients, because hyperglycemia is avoided and energy is provided within a prolonged time span. It is wished to have such a food product, because it would, in addition, have a positive consequence of better food intake control, appetite reduction and slimming.

The present invention addresses the problems set out above.

SUMMARY OF THE INVENTION

Remarkably, it was found that when a food product comprises a highly viscous soluble fiber, a cereal bran and oat bran concentrate used in specific ratios, the viscosity of the food product (or its ingredients) increases disproportionately and unexpectedly, if put in water at 37° C.

Consequently, in a first aspect the present invention provides a food product comprising in percent by weight of dry matter, 0.5-5% of a viscous soluble fibre, 2-20% oat bran concentrate, and 7-35% cereal bran.

In a second aspect, the present invention provides the use of viscous soluble fibre to synergistically increase viscosity of a food product, which also comprises oat bran and/or oat bran concentrate.

In a third aspect the invention provides the use of cereal bran, to increase the viscosity of a food product, which also comprises a viscous soluble fiber and/or oat bran concentrate.

In a fourth aspect, the present invention provides for the use of 1-4%, in percent by weight of dry matter, of a viscous soluble fibre, 4-16% oat bran concentrate, and 10-30% oat bran in the preparation of a food product for providing energy for prolonged time, for slowing down glucose appearance in blood, increasing viscosity of the food product, controlling food intake and/or providing prolonged satiety.

An advantage of the present invention is that it provides a food product that displays a high viscosity if treated in water at 37° C.

Another advantage of the present invention is that the high viscosity is achieved without adding high amounts of cold soluble, high-viscosity fiber, which is often difficult to isolate.

Cereal bran comprises only small amounts of soluble fiber, which is usually not liberated and which is so far thought not to contribute to viscosity at 37° C. (without heating in water to dissolve the fiber). It is surprising that by combining the features of the present invention, a strongly increased viscosity is reached. A synergistic effect may account for the high viscosity.

It is mentioned that the soluble fiber comprised in oat bran concentrate is usually hydrated in a food product that is dissolved in water at 37° C. Due to the special fat-extraction treatment that is employed to obtain oat bran concentrate, the β-glucan contained therein is easily hydrated and dissolved and will thereby aid to increase viscosity.

Additional features and advantages of the present invention are described in, and will be apparent from, the following Detailed Description of the Invention and the figures.

DETAILED DESCRIPTION OF THE INVENTION

Figure 1:
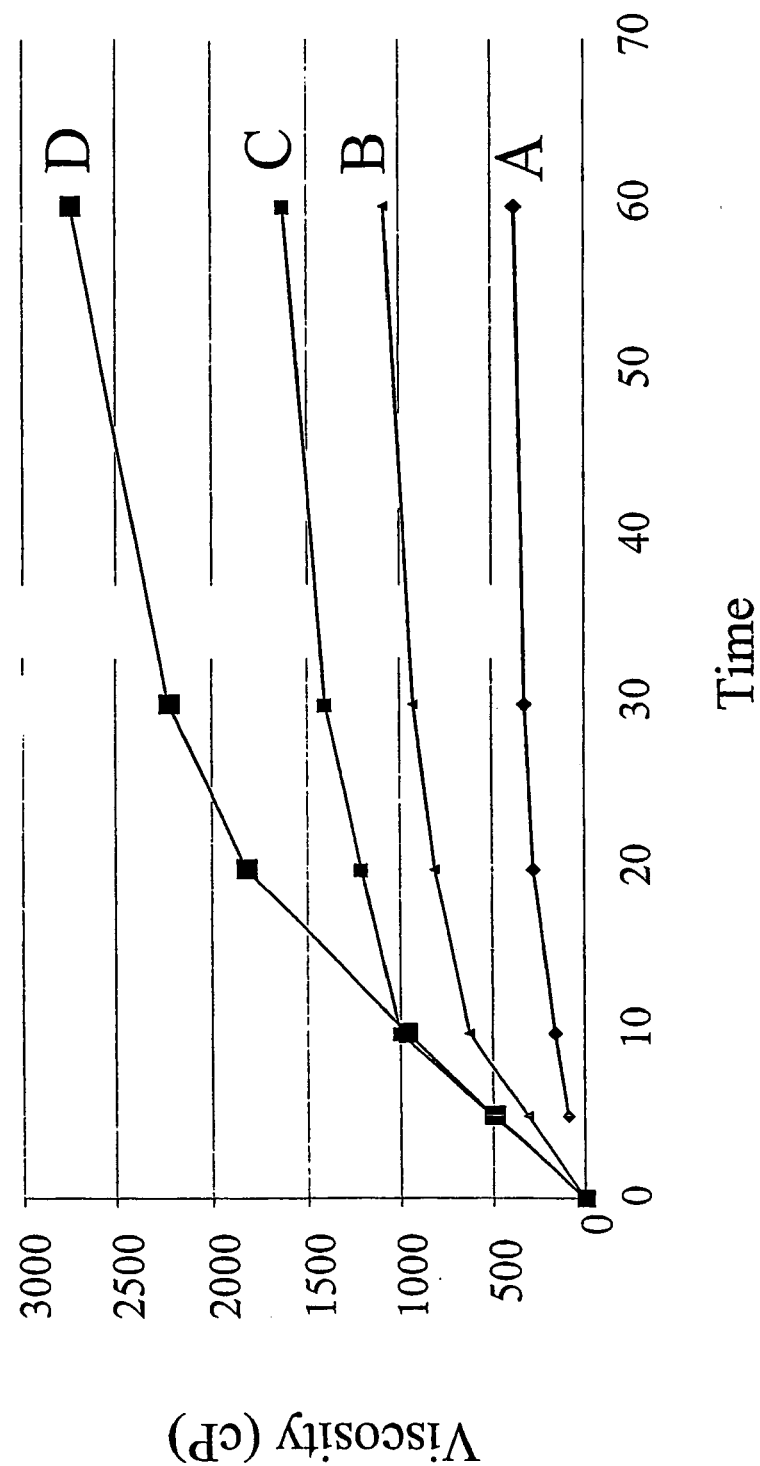
FIG. 1 shows the development of viscosity over time if different components of a food product are put into 200 mL water at 37°. The different curves demonstrate viscosity effect of guar alone (1 g), guar and oat bran (1 g+11 g), guar and oat bran concentrate (1 g+4 g), and finally, guar, oat bran and oat bran concentrate together (1 g+11 g+4 g). An unexpected viscosity-increasing effect of oat bran is visible. Interestingly, oat bran and oat bran concentrate without guar induce practically no viscosity.

Within the context of this specification the word "comprises" is taken to mean "includes, among other things". It is not intended to be construed as "consists only of".

In the context of the present invention, the term food product is intended to encompass and nutritionally complete or supplementary consumable product. Hence, the product may be consumed by humans, pets, such as cats and dogs, for example, and/or other animals. It may be a bar, a snack, a biscuit, or it may be a supplement or a medicament, which may, optionally, be added to another food product. Hence, it may be a baked product, for example based on baked dough, like for example a biscuit, a cookie or a brownie. It may or also an extruded product, like certain snacks, for example. It may also be a liquid product, a pet food, a nutritional formula, an infant or baby formula, a confectionery product, a dairy product, an ice-cream, cereal based product, such as bread, for example.

In the context of the present invention, the term "viscosity mixture" is intended to encompass the compulsory ingredients of a food product according to the present invention. That is, the term is intended to address the mixture of viscous soluble fiber, oat bran and oat barn concentrate.

In the context of the present invention, for the sake of clarity, the term "cereals" is intended not to include the constituents of the "viscosity mixture", even if the latter are partially also based or obtained from cereals.

For clarification the percentages indicated herein are given in percent by weight of dry matter. However, it is mentioned that in most cases the percentages will be valid directly for the food-product, including its natural water content. This is so because many of the proposed food-products, that is a bar, a snack, or a biscuit, have a water content that is relatively low that corresponds more or less to the water content of the raw materials according to the invention (viscous soluble fiber, oat bran and oat bran concentrate). For example, if a food product comprising, in percent by weight, 5 to 15%, preferably 7 to 12% water, and the raw materials have, in the form as furnished by the supplier, essentially the same water content, the indicated percentages apply directly to the food product comprising water.

Bulk sweeteners, in the context of the present invention, comprise, for example, sucrose, invert sugar, glucose syrup, mapple syrup, sorbitol, xylitols, glycerol, polyols and so forth. The term is known by the skilled person and usually is understood to encompass all sweeteners excluding "intense sweeteners", like aspartame, for example.

Preferably, in an embodiment of the food product according to the present invention the viscous soluble fibre is selected from the group comprising guar gum, xanthan, konjac mannan, or mixtures thereof.

Preferably, in a an embodiment of the food product according to the present invention the cereal bran is selected from the group comprising wheat-, barley-, oat bran and mixtures thereof.

Preferably, in an embodiment the food product further comprises ingredients selected from the group of bulk sweeteners, fats, other cereals, fruits, nuts, and mixtures thereof, in total amounts of 33 to 85% by weight of dry matter.

In a preferred embodiment, the food product according to the present invention is a bar, a snack or a biscuit.

In a further embodiment, the food product according to the present invention is in particular suitable for endurance sports and/or for food intake control.

It is preferably consumed prior to sustained effort or endurance sport, for example, jogging, marathon, country ski, cycling, and so forth.

In an additional embodiment, the food product according to the present invention is in particular suitable for diabetic patients.

The food product according to the present invention may be obtained in any suitable way. The exact procedure will depend on the food product and can be as simple as just mixing viscous soluble fiber, oat bran concentrate and a cereal bran in the percentages required by the invention and adding it to a food product of choice.

The viscous soluble fiber may be selected from the group comprising guar gum, xanthan, konjac mannan, β-glucan, agar, alginate, curdlan, gellan gum, locust bean gum, pectin or mixtures thereof. It may be present in 0.5 to 5%, preferably 1 to 4%, more preferably 1 to 3% in percent of dry weight of the food product.

The viscous soluble fiber is preferably a highly viscous and/or cold soluble fiber. That is, it is preferably soluble at or below 40° C., preferably 37° C. For example, the viscous soluble fiber may be used in purified form. However, there is in principle no reason why it cannot be added in a more native form. For example, if xanthan gum is used, which is produced by a micro-organism under anaerobic conditions, it may be sufficient to use the fermentation medium directly without further purifying xanthan. Likewise, if carrageenan is used, which may be extracted from red seaweed, it may be sufficient to add red seaweed to a food product, as long as nutritional safety is granted. However, it is preferred if the soluble viscous fiber is accessible by water if consumed. The viscosity effect will only come forward if water can hydrate the fiber during the digestive process. This is particularly so if purified fiber is used. Viscous soluble fiber is commercially available and its manufacture or isolation procedures form state of the art.

Cereal bran may be selected from the group comprising corn-, rice-, wheat-, barley-, oatbran and/or mixtures thereof. It is present in the food product at 7 to 35%, preferably 10 to 30%, more preferably 12 to 25% and even more preferably at 13 to 18% in percent by weight of the food product.

Cereal brans are supplied by several manufacturers, for example oat bran may be purchased from (Kentaur AG, Lutzelflüh, Switzerland). On the other hand, manufacture procedures of brans are known to the skilled person. Oat bran, for example, is generally produced by grinding clean oat groats or rolled oats and separating the resulting oat flour by sieving, bolting, and/or other suitable means into fractions such as the oat bran fraction, which is usually not more than 50% by weight of the starting material.

Oat bran concentrate is present in the food product according to the invention in an amount of 2 to 20%, preferably 3 to 15%, more preferably 4 to 10%, for example 5 to 8% in percent by weight of dry matter.

The oat bran concentrate may be, for example, a de-fatted oat bran concentrate, which means that the oat bran fraction which has a soluble fibre content of above about 10% by weight has been subjected to solvent extraction to remove, at least partially, oils and fats from the fraction. Ordinarily, oat bran concentrates have a fat or oil content of greater than about 10% by weight. De-fatted oat bran concentrates have an oil or fat content of less than about 7% by weight; more usually about 4% to about 6% by weight. De-fatted oat bran concentrates offer the advantage of better stability of the nutrient composition, increased solubility of the soluble fiber (β-glucan), and improved texture and organoleptic properties of the nutrient composition.

De-fatted oat bran concentrates of this type are commercially available; for example suitable oat bran concentrates may be purchased from Swedish Fiber AB, Väröbacka, Sweden. Alternatively, the oat bran concentrate may be prepared by grinding dry oat grains and then carefully screening the fibre material from the starchy components of the oat grains. The fibre rich material may then be subjected to solvent extraction techniques to remove oils and fats from the material. A suitable procedure for the extraction of oils and fats is disclosed in British patent 1,526,553. The solvent extraction step may also be carried out prior to screening if desired. This screening and extraction procedure would be suitable for producing oat bran concentrates with fibre contents at the lower end of the range; for example an oat bran concentrate having a maximum soluble fibre content of about 15% by weight.

As an alternative, the process described in U.S. Pat. No. 5,106,640 may be adapted to produce the de-fatted oat bran concentrate. In this process, oat grains are rapidly ground in slurry form at a temperature of 0 to 15° C. The slurry is then homogenised and then screened to separate off a fibre rich fraction. The fibre rich fraction may then be subjected to extraction to remove oils and fats. Using this technique, oat bran concentrates having a soluble fibre content of up to about 40% by weight may be prepared. Although oat bran concentrates having very high soluble fibre contents may be used to produce the food product, it is preferred if the soluble fibre content is less than about 20% by weight.

As was said before, the viscous soluble fiber, oat bran and oat bran concentrate (viscosity mixture) may be added to any suitable food product. The time of addition of one, two or all three of these constituents may depend on the recipe of the food product and the manufacture procedure.

A bar of the ready-to-eat type is a food product that may serve as an example.

Accordingly, a mixture comprising essentially dry components (solids) of the bar may be prepared. Such a dry mixture is usually treated and obtained by a dry mixer, and will be later mixed with a binder (a syrup, for example) in a screw mixer, for example. The dry mixture will usually comprise about 40 to 90%, preferably 60 to 80% by weight of the total recipe, whereas the binder will account for the rest of it (60 to 30%, preferably 50 to 40% by weight).

If the food product is a bar to be produced by forming, pressing and cutting, the dry mixture will preferably already comprise the viscosity mixture, that is, 0.5-5% of a viscous soluble fibre, 2-20% oat bran concentrate, and 7-35% cereal bran, in percent of the dry matter of the final bar. For example, the viscosity mixture may make up about 10 to 60% of the dry weight of the total bar.

In addition, the dry mixture for the preparation of a bar may comprise other dry ingredients. These, however, will totally depend on the manufacturer's or consumer's preferences or taste.

Generally, the dry mixtures of a bar comprise cereals, nuts, fruits, chocolate, berries, milk solids, spices, flavours and the like.

Cereals, which comprise essentially starchy material, may be selected from any form of raw or preferably processed cereal. In percent by weight of the dry mixture, about 0 to 30%, preferably 5 to 15%, of cereals are used. Cereals may be just flour that is added to the dry mixture of the bar. However, cereals may be used in the form of crisps, flakes, puffs (oven or gun puffed), extruded and/or extruded-expanded cereals may serve as an example. Cereals are wheat, maize, barley, oat, rice, oat, millet and the like. Hence, cereals comprise, for example, rice or maize crisps, puffed rice or oat, any kind of flakes, baked or compressed and flaked cereals and so forth. Depending on the density of the final bar, the cereals may be chosen accordingly. For example, if a light bar is preferred, it is better to use crisps and/or puffs as cereals, whereas when a dense bar is preferred, it may be better to use flakes or baked and compressed cereals, or simply flour, such as rice flour, for example.

If high amounts of oat bran and/or oat bran concentrate (part of the viscosity mixture) are used to prepare a dry mixture for a bar, other cereals may be completely absent.

In WO 0056171 a process of preparing a bar is disclosed. The bar comprises a cooked-extruded-expanded base mainly comprising rice flour, wheat flour and wheat starch, and/or a cooked-extruded and flaked base mainly comprising corn flour and corn starch. The cooked-extruded and optionally flaked bases according to WO 0056171 are also suitable to serve as cereals in the preparation of the present bar.

Rice crisps, for example, may be obtained by cooking-extruding expanding a mixture of rice flour and water (7 to 15%), optionally also sugars and protein, in 3 to 5 treatment zones of an extruder (for example, a twin-screw extruder). Rice crisps are commercially available, for example, from GEMEF Industries, 44, rue du Louvre, Paris, France.

The dry mixture may also comprise nuts and fruits, for example. Examples are hazelnuts, wall-nuts, pecan-nuts, cashew nuts, almonds, coconut, chest nut, macadamia nut or mixtures of these. Nuts will be present in amounts 0 to 15%, preferably 0 to 10% by weight of the dry mixture. Fruits, such as apple, peach, pear, apricot, banana, orange, pineapple, for example, and/or berries, such as raspberry, strawberry, blackberry, blueberry and the like may also be added to the dry mixture, in amounts of up to 20%, preferably up to 10% by weight. The fruits and berries will preferably be cut into pieces, which may be necessary with big fruits, and dried before addition to the dry mixture.

The binder to be added to the dry mixture may be a syrup. A glucose syrup, for example, comprising a mixture of glucose and/or its polymers obtained by partial hydrolysis of starch, having a DE (dextrose equivalence) value of about 30 to 50 and a water content of from about 15 to 25% by weight of the binder. Generally, the binder may comprise invert sugar, glucose sugar and/or high fructose corn syrup.

The binder may comprise milk solids, which is added in the form of milk powder and/or fresh milk. In the latter case, the addition of water may be at least partially replaced by the addition of milk. WO 0056171 describes a binder in this sense, which comprises 10 to 70 parts of sugar, 0.5 to 5 parts of a binding agent (a polysaccharide such as gum), up to 15 parts of glycerin, up to 60 parts of fruit pulp or cencentrate, up to 10 parts of cocoa powder and added water up to a water content of from 10 to 30%, for example.

The binder may comprise 0 to 15%, preferably 0.5 to 5% glycerol. Glycerol is sometimes added to bars to provide a moisture mouthfeel, while water content has generally to remain low to grant for a prolonged shelf life.

In a basic approach, the binder is simply a syrup comprising water (10 to 20% by weight of binder) and sugars, optionally further comprising fat (0 to 15%, preferably 2 to 10%), lecithin (0 to 1%, preferably 0.01 to 0.2%) and/or flavours, which is obtained by heating the water to 70 to 90° C. and adding/dissolving the sugars under stirring. Syrups with a water content of about 15 to 20% by weight are also commercially available.

By mixing the dry mixture and the binder in the amounts mentioned above, a basic mass of the bar is obtained. This step may be done in any adequate mixing apparatus such as a screw mixer of the helical spring type with an axial sprinkling nozzle or with a coating drum, for example.

The basic mass may be transferred into a suitable forming or pressing apparatus, to shape the bar. For example, a Bepex-Hutt Roller Press type DP may be used, which pushes the basic mass through a slab nozzle or a strand nozzle, under pressures of up to 12 bar, preferably 5 to 10 bar. Another suitable apparatus is the Bepex-Hutt Roller Slab Former type GP, which does not imply such high pressures and therefore yields a flat paste with a lower specific weight.

However, the final bars may be obtained by other means, too. Generally, after forming the basic mass from the binder and the dry mixture, the further process may include forming rolling, pressure rolling, transfer on a pressure band, pre-cooling (10 to 20° C.), cutting of the final shape, for example, by a slitter or guillotine cutter (from Sollich or Rademaker), second cooling (4 to 15° C.), and final packaging of the bar.

For example, a classic bar forming protocol would comprise mixing of the dry mixture and the binder, putting it into a slab former, which yields a slab or a band, transferring to a compression roller, then transferring the slab or band, which has the correct height into a cooling tunnel of 4° C., cooling it down to 20° C., performing a longitudinal cut to obtain stripes of the width of 2 to 5 cm, preferably 3 to 4 cm. Then the stripes are led to a guillotine cutter, which finally yields bars of a length of 5 to 20 cm, preferably 8 to 15 cm.

The following example is given by way of illustration only and in no way should be construed as limiting the subject matter of the present application. Percentages and parts are by weight unless otherwise indicated.

EXAMPLE 1

Preparation of a Bar Comprising Soluble Fiber, Oat Bran Concentrate and Cereal Bran A dry mixture and a binder are prepared using the following ingredients (calculated in percent by weight):

| Binder | |
|---|---|
| Glucose syrup | 17 |
| Sucrose | 8 |

-continued

| Invert sugar | 10 |
|---|---|
| Fat | 7.82 |
| Lecithin | 0.1 |
| Dry mixture | |
| Apple cubes | 10 |
| Rice crisp | 10 |
| Oat bran | 30 |
| Oat bran concentrate | 6.0 |
| Guar | 1 |
| Apple flavor | 0.08 |

The percentages of guar, oat bran and oat bran concentrate, in weight percent of the dry mix, are 1.9%, 18.9% and 7.5%, respectively.

The rice crisps were obtained by cooking-extruding-expanding rice flour according to standard techniques, purchased from GEMEF Industries, 44, rue du Louvre, Paris, France.

The ingredients are thoroughly mixed and put into a Bepex-Hutt Roller Slab Former Type GP, which presses the mixture and yields an about 1.5 cm thick, flat slab. Then pieces of about 20 g are cut out from the pressed paste to obtain longish bars.

The bars had a pleasant taste and a good mouthfeel.

EXAMPLE 2

Viscosity Caused by Fiber, Oat Bran Concentrate and Cereal Bran

Viscosity of different ingredients of the bar of Example 1 is measured alone or in combination with other ingredients (A-D below) if put into water at 37° C. and supplemented with pancreatin, the latter to digest starch and dextrins. A Viscosimeter of Brookfield was used (at a speed of $50^{-1}$, Spindel No. 4).

The ingredients or mixtures were the following:

| A: | 1 g guar |
|---|---|
| B: | 1 g guar + 11 g oat bran |
| C: | 1 g guar + 4 g oat bran concentrate |
| D: | 1 g guar + 11 g oat bran + 4 g oat bran concentrate |

Viscosity of the 4 samples was measured over a period of 90 minutes. The results are given in FIG. 1.

As can be seen in FIG. 1, the combination of guar and oat bran causes a high increase of viscosity after 60 and 90 minutes. This is to be expected, because both comprise soluble fiber that will be released and hydrated in water at 37° C. over time.

Unexpectedly, the addition of oat bran causes an even stronger increase in viscosity. This is surprising, because oat bran contains only little amounts of soluble fiber, and, what is more, the fiber will usually not be dissolved by a mild treatment as the present one.

In conclusion, a surprisingly high viscosity was achieved with mixtures of a high-viscous soluble fiber, oat bran concentrate and oat bran in specific amounts. The result is advantageous, because it means that high viscosity in a food product, such as a standard bar, may be achieved with little percentages of soluble fiber, if they are completed with oat bran, which is usually not very expensive or difficult to obtain.

EXAMPLE 3

Sugar Release During Dialysis of a Bar Mix in Water and Pancreatin 75 g of the mixture according to example 1 was compared with a similar mixture, wherein oat bran concentrate and guar was entirely replaced by rice crisp. The mixtures were completed with each 0.1 g pancreatin, to simulate saliva.

The two mixtures were put into a dialysis bag (diameter: 2 cm, length: 30 cm), which was incubated in a container comprising 1 L mineral water at 37° C. under slight agitation.

Total sugars were measure using the phenol-sufuric method every 30 min for up to 3 hours. The dialysis bag was shortly kneaded every ten minutes.

Figure 2:
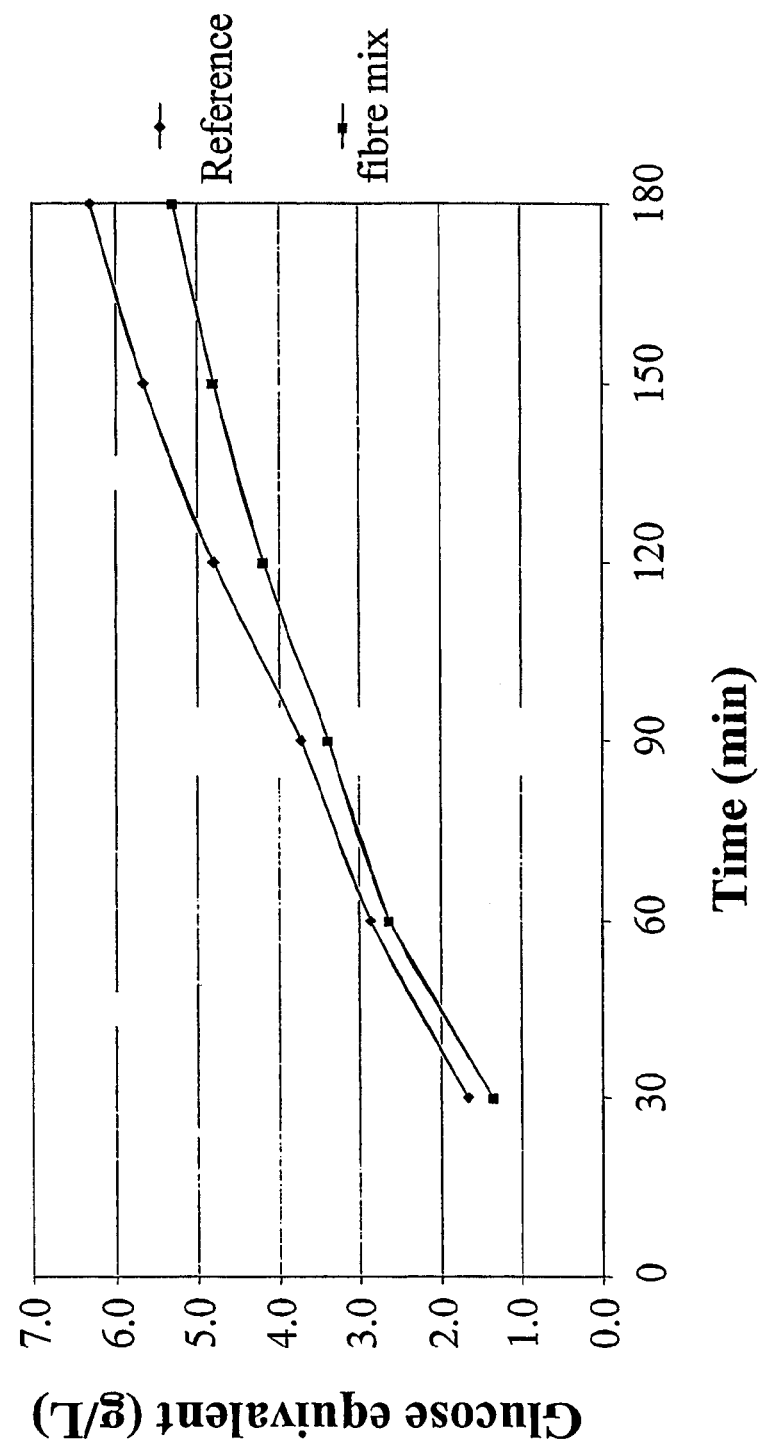
FIG. 2 shows the appearance of sugar in water during dialysis of the ingredients of different bars. The upper line is the reference line and corresponds to the dialysis of a bar that is free of cereal bran and guar gum. The lower line reflects the dialysis of the same bar, wherein rice crisps is partially replaced by guar gum and oat bran concentrate (see.

The results are given in FIG. 2. It can be seen that the mixture comprising guar, oat bran and oat bran concentrate releases sugar slower that the reference, which only comprises oat bran.

In conclusion, the combined ingredients of a highly viscous, soluble fibre, cereal bran and oat bran concentrate is suitable to delay sugar release. The experiments which model the digestive tract suggest that the food product according to the present invention will slow down or delay glucose absorption, prevent hyperglycemia, reduce carbohydrate absorption rate, prolong glucose fuel from the intestines, prolong performance, for example in an endurance sprot, provide energy and satiety for a prolonged time.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A food product comprising in percent by weight of dry matter, 0.5 to about 5% of a viscous soluble fibre, 2 to about 20% oat bran concentrate, and 10 to about 30% cereal bran.

2. The food product according to claim 1, wherein the viscous soluble fibre is selected from the group consisting of guar gum, xanthan, konjac mannan, and mixtures thereof.

3. The food product according to claim 1, wherein the cereal bran is selected from the group consisting of wheat-, barley-, oat bran and mixtures thereof.

4. The food product according to claim 1, further comprising ingredients selected from the group consisting of bulk sweeteners, fats, other cereals, fruits, nuts, and mixtures thereof, in total amounts of 33 to about 85% by weight of dry matter.

5. The food product according to claim 1, which is in a form selected from the group consisting of a bar, a snack and a biscuit.

6. The food product according to claim 1, which is designed for endurance sports or for food intake control.

7. The product according to claim 1, which is designed for diabetic patients.

8. A method for preparing a food product, the method comprising using 1 to about 4%, in percent by weight of dry matter, of a viscous soluble fibre, 4 to about 16% oat bran concentrate, and 10 to about 30% oat bran in the preparation of the food product.

9. The method of claim 8, wherein the oat bran is an oat bran concentrate.

10. The method of claim 8 comprising the step of adding the cereal bran to the viscous soluble fiber and an oat bran concentrate.

11. A method for reducing the appearance of glucose in the blood in response to a food product comprising the step of using in the food product 1 to about 4%, in percent by weight of dry matter, of a viscous soluble fibre, 4 to about 16% oat bran concentrate, and 10 to about 30% oat bran in the preparation of the food product.

12. The method according to claim 11, wherein the viscous soluble fibre is selected from the group consisting of guar gum, xanthan, konjac mannan, and mixtures thereof.

13. The method according to claim 11, wherein the cereal bran is selected from the group consisting of wheat-, barley-, oat bran and mixtures thereof.

14. The method according to claim 11, wherein the food product comprises ingredients selected from the group consisting of bulk sweeteners, fats, other cereals, fruits, nuts, and mixtures thereof, in total amounts of 33 to 85% by weight of dry matter.

15. The method according to claim 11, wherein the food product is in a form selected from the group consisting of a bar, a snack and a biscuit.

16. A method for reducing food intake in an individual comprising the steps of feeding the individual a food product comprising in percent by weight of dry matter, 0.5 to about 5% of a viscous soluble fibre, 2 to about 20% oat bran concentrate, and 10 to about 30% cereal bran.

17. The method according to claim 16, wherein the viscous soluble fibre is selected from the group consisting of guar gum, xanthan, konjac mannan, and mixtures thereof.

18. The method according to claim 16, wherein the cereal bran is selected from the group consisting of wheat-, barley-, oat bran and mixtures thereof.

19. The method according to claim 16, wherein the food product comprises ingredients selected from the group consisting of bulk sweeteners, fats, other cereals, fruits, nuts, and mixtures thereof, in total amounts of 33 to 85% by weight of dry matter.

20. The method according to claim 16, wherein the food product is in a form selected from the group consisting of a bar, a snack and a biscuit.

21. A method for providing nutrition to a diabetic patient comprising the steps of feeding the diabetic patient a food product comprising in percent by weight of dry matter, 0.5 to about 5% of a viscous soluble fibre, 2 to about 20% oat bran concentrate, and 10 to about 30% cereal bran.

22. The method according to claim 21, wherein the viscous soluble fibre is selected from the group consisting of guar gum, xanthan, konjac mannan, and mixtures thereof.

23. The method according to claim 21, wherein the cereal bran is selected from the group consisting of wheat-, barley-, oat bran and mixtures thereof.

24. The method according to claim 21, wherein the food product comprises ingredients selected from the group consisting of bulk sweeteners, fats, other cereals, fruits, nuts, and mixtures thereof, in total amounts of 33 to 85% by weight of dry matter.

25. The method according to claim 21, wherein the food product is in a form selected from the group consisting of a bar, a snack and a biscuit.

26. The method according to claim 21, wherein the viscous soluble fibre is selected from the group consisting of guar gum, xanthan, konjac mannan, and mixtures thereof.

* * * * *